(12) United States Patent
Balagopalan et al.

(10) Patent No.: US 11,632,317 B2
(45) Date of Patent: Apr. 18, 2023

(54) CONFLICT RESOLUTION DESIGN FOR IMPORTING TEMPLATE PACKAGE IN SITES CLOUD SERVICE

(71) Applicant: ORACLE INTERNATIONAL CORPORATION, Redwood Shores, CA (US)

(72) Inventors: Sivakumar Balagopalan, Sunnyvale, CA (US); Ken Ching Yi Young, San Mateo, CA (US); Vamsikrishna Konchada, Eden Prairie, MN (US); Matt E. Miller, Puyallup, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 455 days.

(21) Appl. No.: 15/663,180

(22) Filed: Jul. 28, 2017

(65) Prior Publication Data
US 2018/0083852 A1 Mar. 22, 2018

Related U.S. Application Data

(60) Provisional application No. 62/396,039, filed on Sep. 16, 2016.

(51) Int. Cl.
| | |
|---|---|
| G06F 15/16 | (2006.01) |
| G06F 9/54 | (2006.01) |
| H04L 29/06 | (2006.01) |
| H04L 43/0811 | (2022.01) |
| H04L 67/00 | (2022.01) |
| H04L 67/10 | (2022.01) |
| G06F 9/50 | (2006.01) |
| H04L 41/0873 | (2022.01) |
| H04L 41/5041 | (2022.01) |
| H04L 67/51 | (2022.01) |
| H04L 67/02 | (2022.01) |
| H04L 41/50 | (2022.01) |

(52) U.S. Cl.
CPC ........ *H04L 43/0811* (2013.01); *G06F 9/5072* (2013.01); *H04L 41/0873* (2013.01); *H04L 41/5048* (2013.01); *H04L 67/10* (2013.01); *H04L 67/34* (2013.01); *H04L 67/51* (2022.05); *H04L 41/5096* (2013.01); *H04L 67/02* (2013.01)

(58) Field of Classification Search
CPC .................................................. H04L 43/0811
USPC ....................................................... 709/224
See application file for complete search history.

(56) References Cited

U.S. PATENT DOCUMENTS

| | | | | |
|---|---|---|---|---|
| 7,529,780 B1 * | 5/2009 | Braginsky | ............... | H04L 67/42 |
| 8,671,390 B2 * | 3/2014 | Davydok | ............ | G06F 9/44505 |
| | | | | 717/108 |
| 10,002,157 B2 * | 6/2018 | Dzikowska | ......... | G06F 16/2365 |

(Continued)

*Primary Examiner* — Hamza N Algibhah
(74) *Attorney, Agent, or Firm* — Tucker Ellis LLP

(57) ABSTRACT

A computer-implemented method can include receiving an indication of a template package to be imported in a sites cloud service and further determining whether there is a potential conflict in connection with the template package to be imported in the sites cloud service. The method can also include issuing a notification concerning the potential conflict in connection with the template package to be imported in the sites cloud service responsive to an indication that there is a potential conflict in connection with the template package to be imported in the sites cloud service.

19 Claims, 16 Drawing Sheets

(56) References Cited

U.S. PATENT DOCUMENTS

| | | | | |
|---|---|---|---|---|
| 2006/0253478 | A1* | 11/2006 | Graham | G06F 40/174 |
| 2009/0119345 | A1* | 5/2009 | Davydok | G06F 9/44505 |
| 2012/0233547 | A1* | 9/2012 | McLachlan | G06Q 10/06 |
| | | | | 715/764 |
| 2014/0006263 | A1* | 1/2014 | Townsend | G06F 3/04817 |
| | | | | 705/39 |
| 2014/0046980 | A1* | 2/2014 | Kleinschmidt | G06F 17/218 |
| | | | | 707/793 |
| 2014/0188790 | A1* | 7/2014 | Hunter | H04L 63/08 |
| | | | | 707/610 |
| 2014/0201145 | A1* | 7/2014 | Dorman | G06F 16/27 |
| | | | | 707/634 |
| 2014/0259005 | A1* | 9/2014 | Jeffrey | G06F 8/65 |
| | | | | 717/173 |
| 2015/0058140 | A1* | 2/2015 | Dixon | G06Q 30/0277 |
| | | | | 705/14.73 |
| 2015/0113448 | A1* | 4/2015 | Underwood | G06F 40/14 |
| | | | | 715/760 |
| 2015/0331411 | A1* | 11/2015 | Dashevskiy | G05B 19/402 |
| | | | | 700/114 |
| 2016/0179769 | A1* | 6/2016 | Gershom | G06F 16/23 |
| | | | | 715/235 |
| 2016/0328217 | A1* | 11/2016 | Hagerty | H04L 63/102 |
| 2016/0335243 | A1* | 11/2016 | Zhai | G06F 16/2228 |
| 2017/0004203 | A1* | 1/2017 | Pandit | G06F 16/316 |
| 2017/0177829 | A1* | 6/2017 | Wilkinson | G06F 19/3456 |

* cited by examiner

CONFLICT RESOLUTION DESIGN FOR IMPORTING TEMPLATE PACKAGE IN SITES CLOUD SERVICE

CROSS-REFERENCE TO RELATED APPLICATION

This application claims the benefit of U.S. Provisional Patent Application No. 62/396,039, titled "CONFLICT RESOLUTION DESIGN FOR IMPORTING TEMPLATE PACKAGE IN SITES CLOUD SERVICE" and filed on Sep. 16, 2016, the content of which is hereby fully incorporated by reference herein.

BACKGROUND

Content and feature-rich engagement sites[1] can help drive effective interactions with various groups such as customers, partners, and employees, leading to higher satisfaction and loyalty. Sites cloud service can enable users that may have little to no website experience to rapidly assemble rich, interactive engagement microsites for marketing and communities. As used herein, sites cloud service generally refers to online services, tools, and/or packages that can be used to drive digital engagement, collaboration, governance, and extensibility for employees, customers, and partners.

[1] As used herein, the term 'site' is generally synonymous with 'website'

Also used herein, a theme generally refers to a collection of page layouts, content, and/or components that represent a site design, and component generally refers to a basic building block of a site, such as an image, gallery, video, title, paragraph, map, "contact us" feature, or button, for example.

Sites cloud service can include intuitive assembly of content, applications, and processes to build rich community and marketing sites. For example, sites cloud service can allow for the rapid assembly of rich digital experiences for marketing sites, communities, and other business needs using themes, components, and applications. Internal and external teams can collaborate in creating content, building sites, and coordinating site updates. Community and marketing microsites can be viewed, managed, and administered by way of a single console.

A site builder interface can be used to create, edit, and publish microsites, and can include page management, device preview, and the ability to change the site theme. The interface can also manage SEO settings, metadata, and navigation.

As used herein, a template package generally refers to a combination of objects that include a template, a theme used by the template, and one or more components used in the template. In situations where a certain template package it to be imported in a tenant, there is a great potential for conflicts, such as an object already existing in the tenant, a different object in the tenant having the same name, the object already existing in the tenant with a different name, the object having been deleted and existing in the tenant's trash, the object already existing in the tenant but without permission for the user to overwrite, and any given number of conflicts that could arise from a lack of security.

Unresolved conflicts can be significantly destructive in that they can cause the tenant's entire cloud service to be corrupted, and live sites to be broken. Conflict detection is virtually impossible to be performed by a human user[2] because, for example, a user cannot see objects that are not shared with him/her by other user, so there is no way that the user could check for conflicts from the objects that are not shared with him/her. Also, it is generally extremely difficult—and sometimes impossible—for a human to correct all of object references by name or GUID (globally unique identifier) when an import operation involves the renaming of objects or generation of new GUIDs.

[2] As used herein, the term user generally refers to—but is not limited to—an end user, a customer, or a site administrator Accordingly, there remains a need for automatic and effective conflict resolution solutions with specific regard to the importing of template packages.

DETAILED DESCRIPTION OF THE EMBODIMENTS

As used herein, sites cloud service generally refers to online services, tools, and/or packages that can be used to drive digital engagement, collaboration, governance, and extensibility for employees, customers, and partners. A theme generally refers to a collection of page layouts, content, and/or components that represent a site design, and component generally refers to a basic building block of a site, such as an image, gallery, video, title, paragraph, map, or button, for example.

A template package generally refers to a combination of objects that include a template, at least one theme used by the template, and one or more components used in the template. Each object can be identified by an object name and/or a globally unique identifier (GUID), for example. An object name is generally unique within a single tenant in a sites cloud service, and a GUID is generally unique across multiple tenants within the sites cloud service.

Implementations of the disclosed technology are generally directed to systems and methods for identifying possible conflicts in connection with a template package to be imported in a sites cloud service. Responsive to an identification of a potential conflict, the systems and methods can also include determining a conflict resolution to safeguard existing objects in the tenant, for example.

Figure 1:
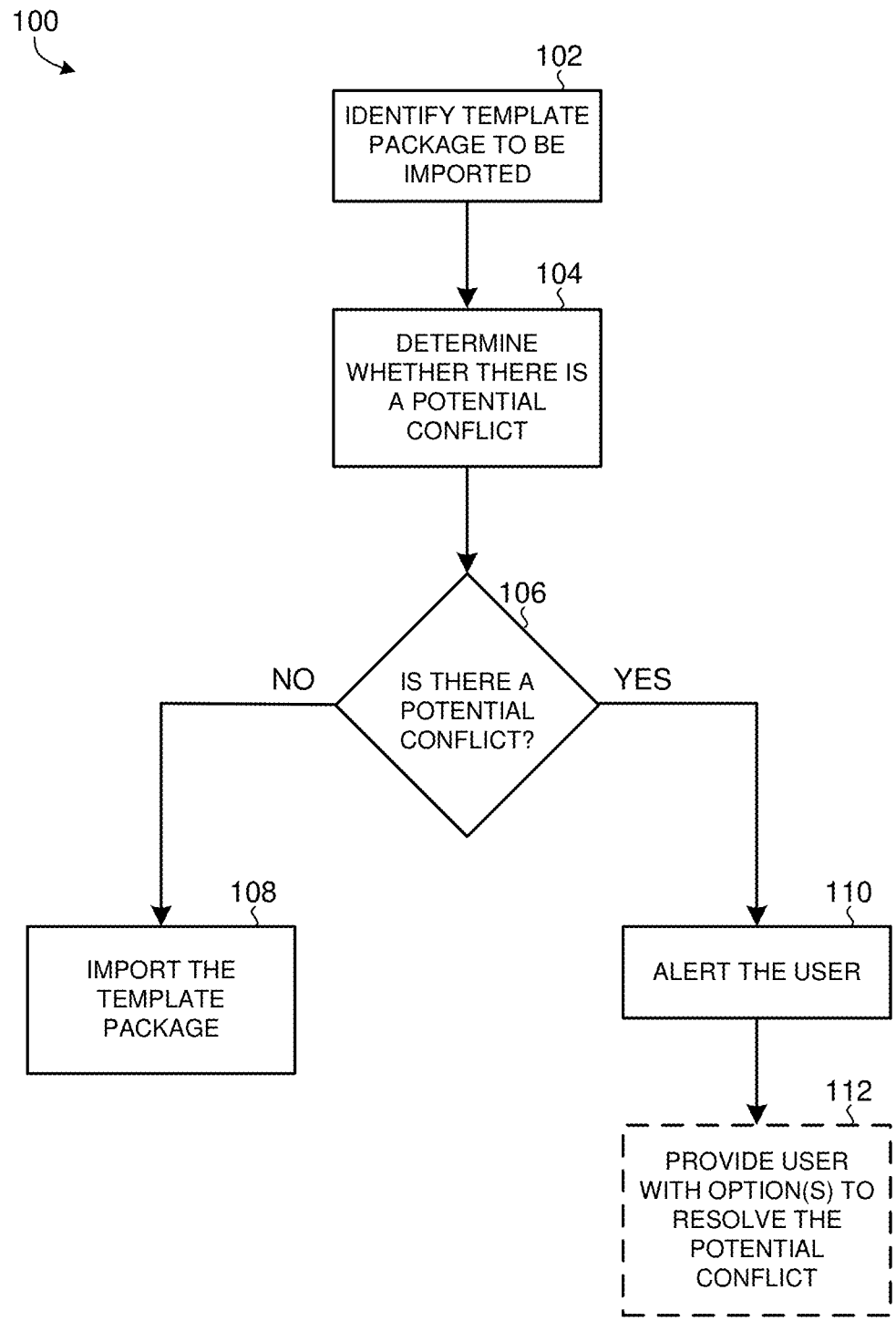
FIG. 1 illustrates an example of a computer-controlled method in accordance with certain embodiments of the disclosed technology.

FIG. 1 illustrates an example of a computer-controlled method 100 in accordance with certain embodiments of the disclosed technology. At 102, a template package to be imported in a sites cloud service is identified. For example, a user may select the template package to be imported. At 104, a determination is made as to whether a potential conflict might exist in connection with importing the template package. The determination can be made automatically responsive to the identifying at 102, for example, or, in alternative embodiments, the system can initiate the determination responsive to a request received from a user.

At 106, a decision block advances the method 100 based on the determination made at 104. Responsive to a determination that a potential conflict might indeed exist, the method 100 advances to 110. However, responsive to a determination that a potential conflict does not exist, the method 100 advances to 108.

At 110, the system issues a notification regarding the potential conflict. For example, the system can generate an alert and send it to a user. The alert can simply alert the user to the potential conflict or include information pertaining to the potential conflict. In certain embodiments, the system can provide one or more options for resolving the potential conflict, as indicated at 112.

At 108, the template package is imported in the sites cloud service. In certain alternative embodiments, a notification can be issued, e.g., to a user, indicating that the template package is being imported and/or that there are no potential conflicts in connection with the importing.

Figure 2:
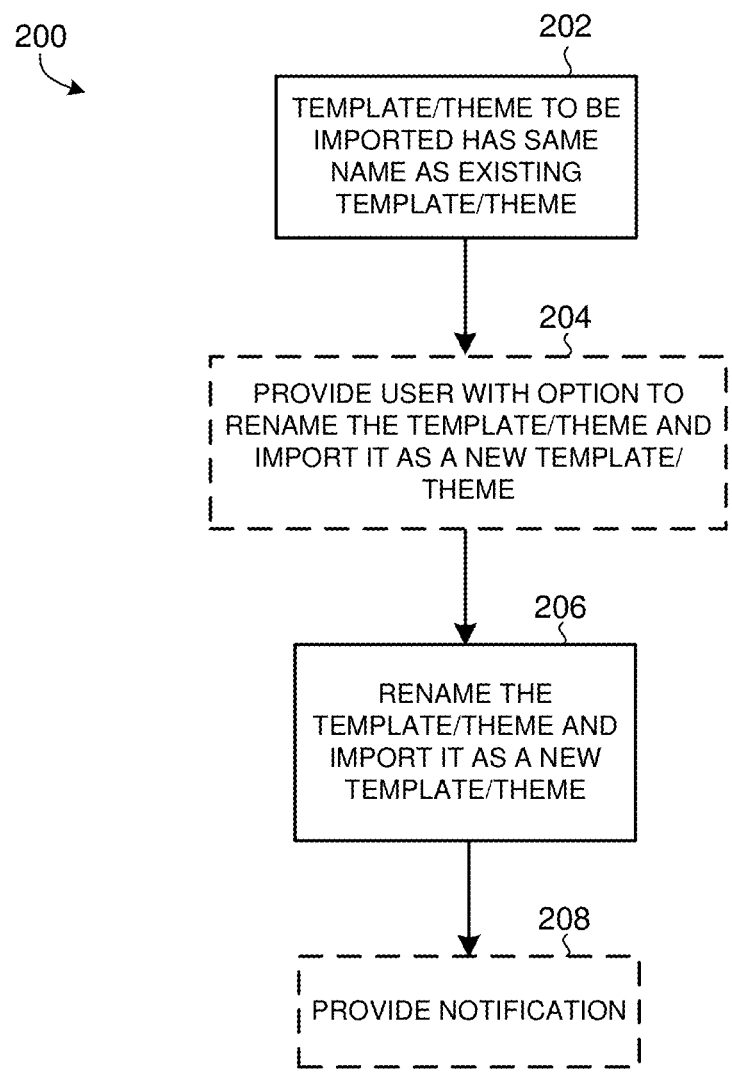
FIG. 2 illustrates an example of a computer-controlled method for resolving an identified potential template/theme name conflict in accordance with certain embodiments of the disclosed technology.

FIG. 2 illustrates an example of a computer-controlled method 200 for resolving an identified potential template/theme[3] name conflict in accordance with certain embodiments of the disclosed technology. At 202, a determination is made that a template/theme of a template package to be imported in a sites cloud service has the same name as a template/theme that already exists in the sites cloud service.

[3] It should be noted that template/theme indicates either a template or a theme, e.g., of a template package to be imported In certain embodiments, the system can provide a user, e.g., by way of a user interface, with an option to rename the template/theme to be imported and import it as a new template/theme, as indicated by 204.

At 206, the system renames the template/theme to be imported and imports it as a new template/theme in the sites cloud service. The system can do this based on receiving an indication to do so from a user responsive to the option provided at 204, or the system can do this automatically. In certain embodiments, e.g., after the renaming of a theme and importing as a new theme, any potential name references to the theme in the template can be automatically corrected. In embodiments where the system performs the renaming and importing automatically, the system can provide a notification, e.g., to the user, that the template/theme is being renamed and imported as a new template/theme, as indicated by 208.

Figure 3:
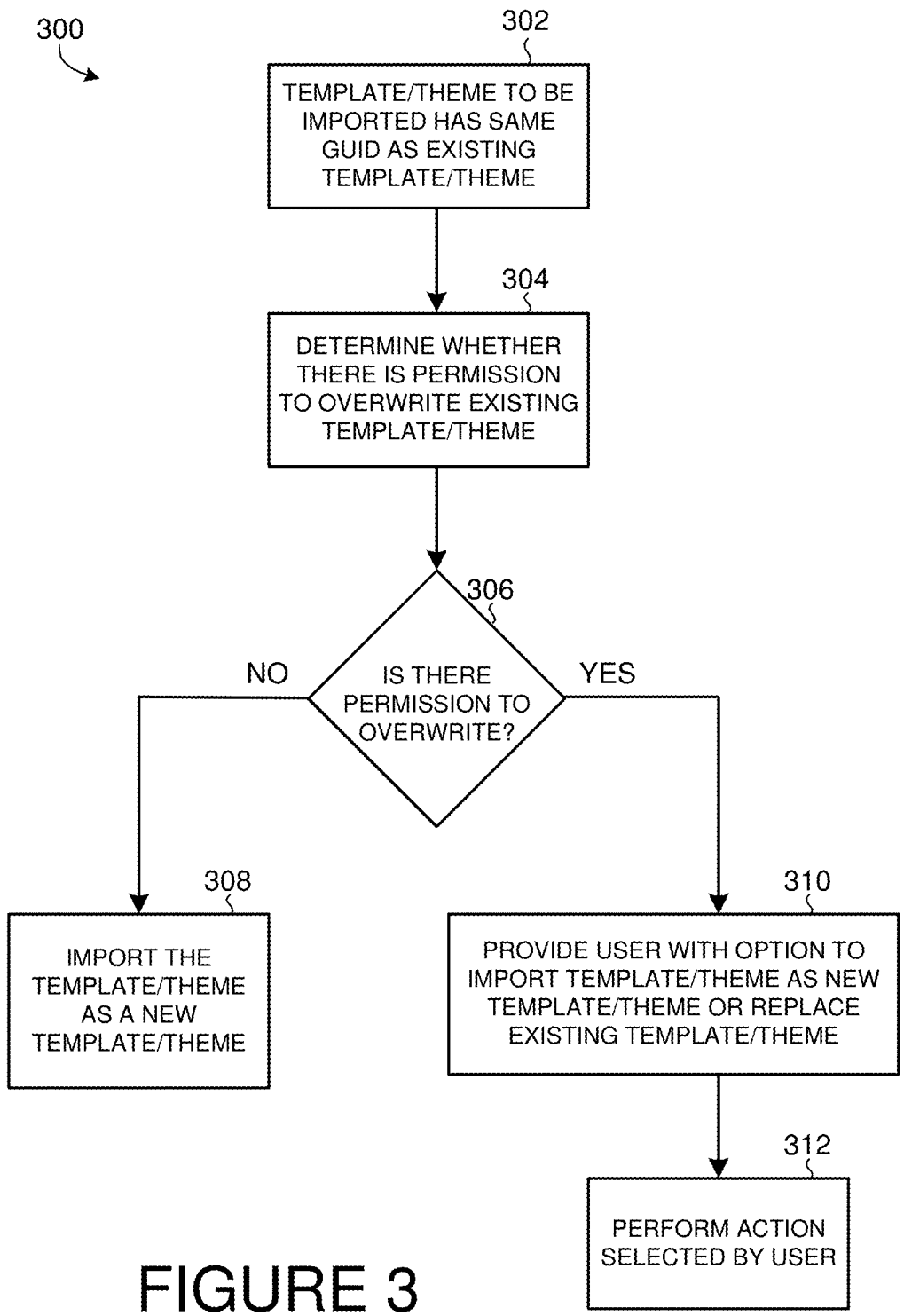
FIG. 3 illustrates an example of a computer-controlled method for resolving an identified potential template/theme globally unique identifier (GUID) conflict in accordance with certain embodiments of the disclosed technology.

FIG. 3 illustrates an example of a computer-controlled method 300 for resolving an identified potential template/theme globally unique identifier (GUID) conflict in accordance with certain embodiments of the disclosed technology. At 302, a determination is made that a template/theme of a template package to be imported in a sites cloud service has the same GUID as a template/theme that already exists in the sites cloud service.

At 304, a determination can be made as to whether a permission exists for the template/theme to be imported to overwrite the already-existing template/theme having the same GUID. At 306, a decision block advances the method 300 based on the determination that was made at 304. Responsive to a determination that there is indeed a permission for the template/theme to be imported to overwrite the already-existing template/theme, the method 300 advances to 310; otherwise, the method 300 advances to 308.

At 308, the system automatically imports the template/theme to be imported as a new template/theme. In certain embodiments, e.g., after the importing of a new theme that yields a new GUID for the imported theme, any GUID references to the theme in the template can be automatically corrected. In certain embodiments, the system can also provide a notification, e.g., to a user, that the template/theme is being imported as a new template/theme.

At 310, the system provides the user with at least two options: import the template/theme to be imported as a new template/theme, or replace the already-existing template/theme with the template/theme to be imported while maintaining the same name of the template/theme. In embodiments where a theme is imported as a new theme that yields a new GUILD for the imported theme, any GUID references to the theme in the template can be automatically-corrected.

In certain embodiments, the system can designate a default option. In such embodiments, the system can list the default option as the first option in the listing and/or pre-select the default option, for example.

Responsive to the user making a selection from the options presented at 310, the system can then implement the option selected by the user, e.g., import the template/theme as a new object or replace the already-existing template/theme with the imported template/theme, as indicated by 312.

Figure 4:
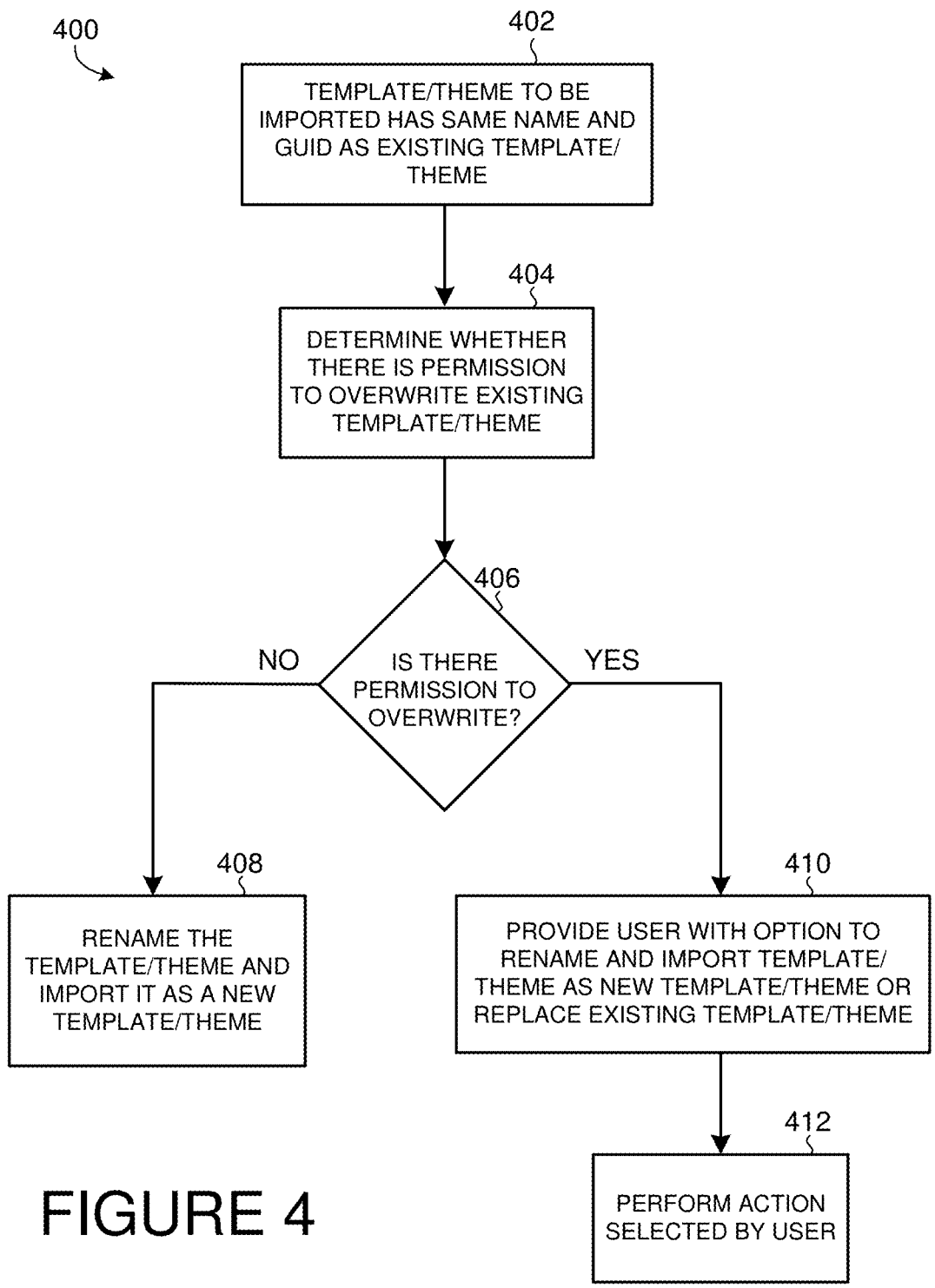
FIG. 4 illustrates an example of a computer-controlled method for resolving an identified potential template/theme name and GUID conflict in accordance with certain embodiments of the disclosed technology.

FIG. 4 illustrates an example of a computer-controlled method 400 for resolving an identified potential template/theme name and GUID conflict in accordance with certain embodiments of the disclosed technology. At 402, a determination is made that a template/theme of a template package to be imported in a sites cloud service has both the same name and the same GUID as a template/theme that already exists in the sites cloud service.

At 404, a determination can be made as to whether a permission exists for the template/theme to be imported to overwrite the already-existing template/theme having the same name and GUID. At 406, a decision block advances the method 400 based on the determination that was made at 404. Responsive to a determination that there is indeed a permission for the template/theme to be imported to overwrite the already-existing template/theme, the method 400 advances to 410; otherwise, the method 400 advances to 408.

At 408, the system automatically renames the template/theme to be imported and imports it as a new template/theme. In certain embodiments, e.g., after the importing of a new theme that yields a new GUID and a new name for the imported theme, any GUID or name references to the theme in the template can be automatically corrected. In certain embodiments, the system can also provide a notification, e.g., to a user, that the template/theme is being renamed and imported as a new template/theme.

At 410, the system provides the user with at least two options: rename the template/theme to be imported and import it as a new template/theme, or replace the already-existing template/theme with the template/theme to be imported. The system can then implement the option selected by the user as indicated at 412, e.g., rename and import the template/theme as a new object or replace the already-existing template/theme with the imported template/theme. In certain embodiments, e.g., where a theme is imported as a new theme that yields a new GUID and a new name for the imported theme, any GUID or name references to the theme in the template can be automatically corrected.

Figure 5:
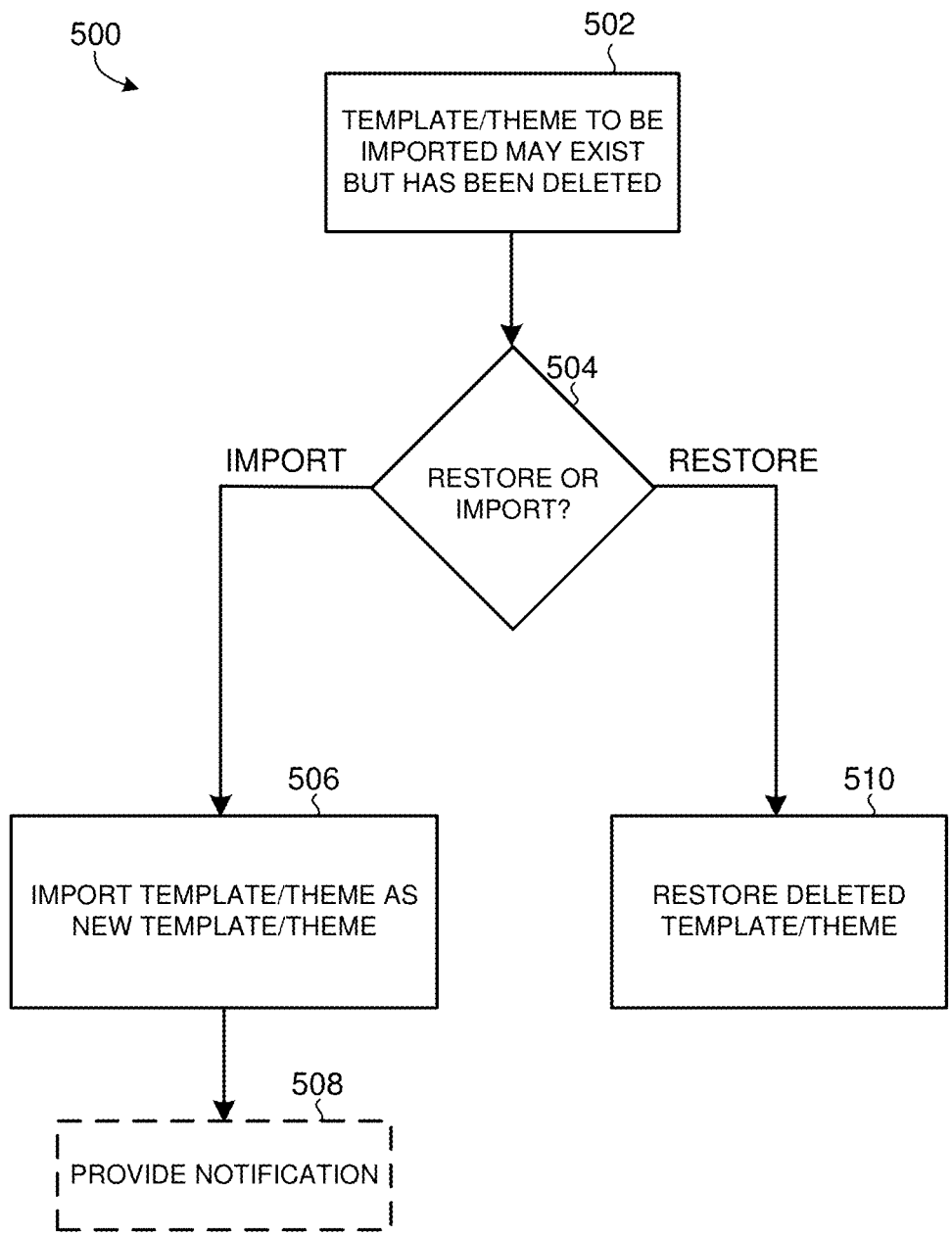
FIG. 5 illustrates an example of a computer-controlled method for resolving an identified potential template/theme trash conflict in accordance with certain embodiments of the disclosed technology.

FIG. 5 illustrates an example of a computer-controlled method 500 for resolving an identified potential template/theme trash conflict in accordance with certain embodiments of the disclosed technology. At 502, a determination is made that a template/theme of a template package to be imported in a sites cloud service may already exist in the sites cloud service but has been deleted.

In certain embodiments, the system can query a user, e.g., by way of a user interface, as to whether the user wishes to restore the deleted template/theme rather than import the template/theme as a new template/theme, as indicated by 504. For example, the user interface can provide an "Okay" button for the user to indicate a desire for the system to proceed with the importing and a "Cancel" button for the user to indicate a desire to restore rather than import.

The system can import the template/theme to be imported as a new template/theme in the sites cloud service, as indicated by 506. The system can also provide a notification that, if the existing template/theme is restored from Trash, it will be renamed, e.g., to avoid a potential conflict with the imported template/theme. In certain embodiments, any name references to a restored and renamed theme in a template can be automatically corrected. In certain embodiments where the system can perform the importing automatically, the system can provide a notification, e.g., to the user, regarding the action performed, as indicated by 508.

Responsive to an indication received by the system from a user indicating a decision to restore the deleted template/theme, the system can restore the deleted template/theme, as indicated by 510. This can be accomplished, for example, by the user cancelling the dialog, e.g., by selecting a "Cancel" button, to abort the import and then go to Trash to restore the template/theme manually.

Figure 6:
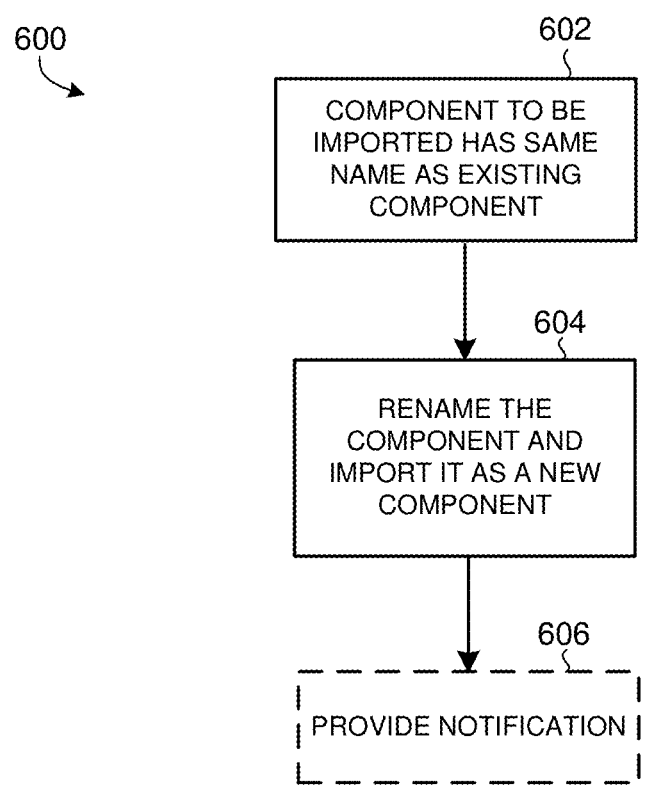
FIG. 6 illustrates an example of a computer-controlled method for resolving an identified potential component name conflict in accordance with certain embodiments of the disclosed technology.

FIG. 6 illustrates an example of a computer-controlled method 600 for resolving an identified potential component name conflict in accordance with certain embodiments of the disclosed technology. At 602, a determination is made that a component[4] of a template of a template package to be imported in a sites cloud service has the same name as a component that already exists in the sites cloud service.

[4] Such as an image, gallery, video, title, paragraph, map, "contact us" feature, or button, for example At 604, the system renames, e.g., automatically, the component to be imported and imports it as a new component. The system can provide a notification, e.g., to a user, that the component is being renamed and imported as a new component, as indicated by 606. In certain embodiments, e.g., after the importing of a renamed component, any name references to the component in the template can be automatically corrected.

Figure 7:
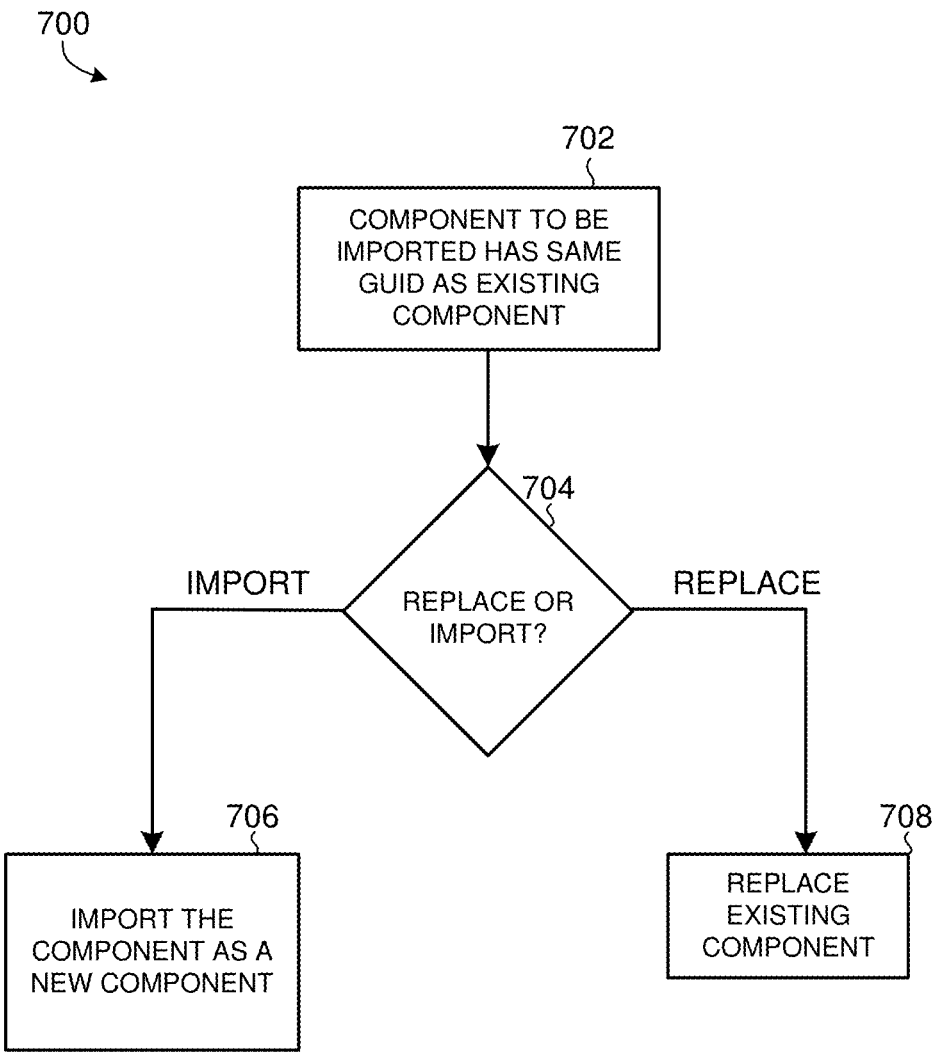
FIG. 7 illustrates an example of a computer-controlled method for resolving an identified potential component globally unique identifier (GUID) conflict in accordance with certain embodiments of the disclosed technology.

FIG. 7 illustrates an example of a computer-controlled method 700 for resolving an identified potential component GUID conflict in accordance with certain embodiments of the disclosed technology. At 702, a determination is made that a component of a template of a template package to be imported in a sites cloud service has the same GUID as a component that already exists in the sites cloud service.

In certain embodiments, the system can query a user, e.g., by way of a user interface, as to whether the user wishes to import the component as a new component or replace the existing component and keep the existing component name, as indicated by 704.

Responsive to an indication received by the system from a user indicating a decision to import the component as a new component, the system can perform the desired action, as indicated by 706. In certain embodiments, e.g., after import a component as a new component that yields a new GUID, any GUID references to the imported component in the template can be automatically corrected.

Responsive to an indication received by the system from a user indicating a decision to replace the existing component and keep the existing component name, the system can perform the desired action, as indicated by 708.

Figure 8:
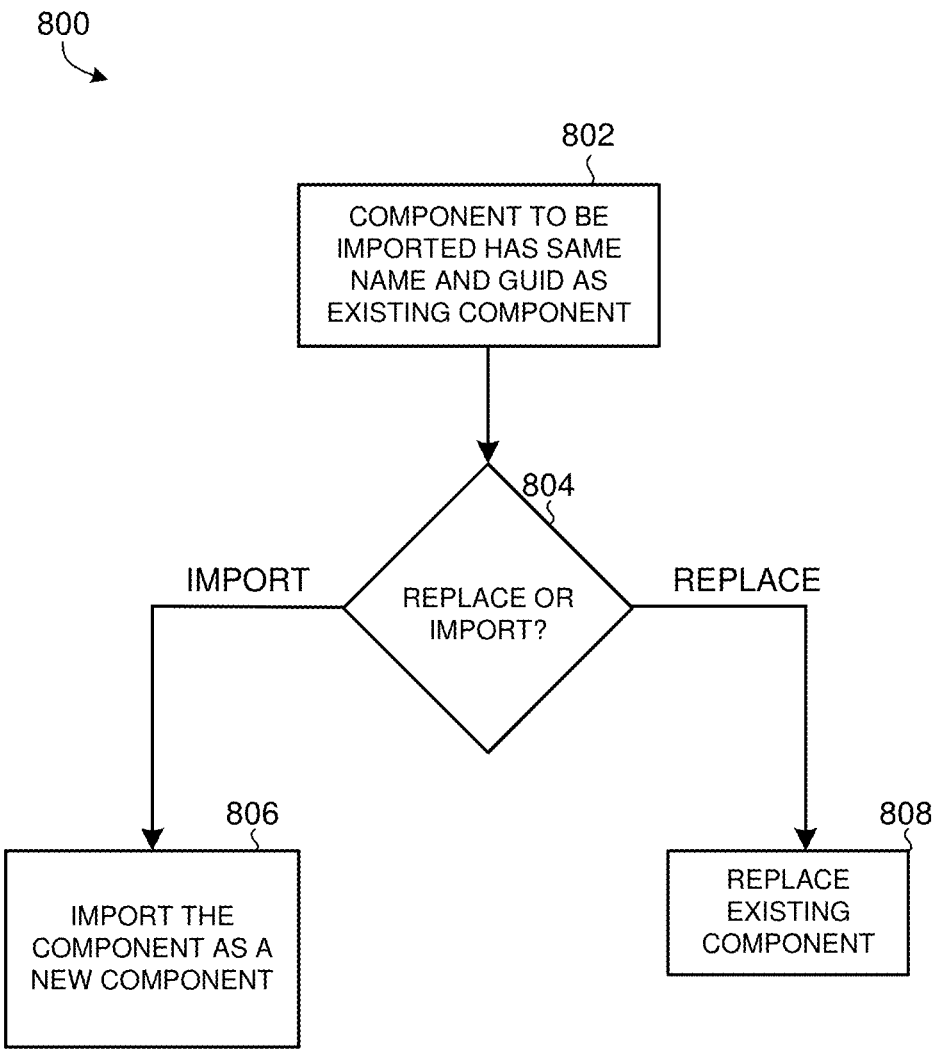
FIG. 8 illustrates an example of a computer-controlled method for resolving an identified potential component name and GUID conflict in accordance with certain embodiments of the disclosed technology.

FIG. 8 illustrates an example of a computer-controlled method 800 for resolving an identified potential component name and GUID conflict in accordance with certain embodiments of the disclosed technology. At 802, a determination is made that a component of a template of a template package to be imported in a sites cloud service has the same name and GUID as a component that already exists in the sites cloud service.

In certain embodiments, the system can query a user, e.g., by way of a user interface, as to whether the user wishes to import the component as a new component or replace the existing component and keep the existing component name, as indicated by 804.

Responsive to an indication received by the system from a user indicating a decision to import the component as a new component, the system can perform the desired action, as indicated by 806. In certain embodiments, e.g., after import a component as a new component that yields a new GUID and name, any GUID and name references to imported component in the template can he automatically corrected.

Responsive to an indication received by the system from a user indicating a decision to replace the existing component and keep the existing component name, the system can perform the desired action, as indicated by 808.

Figure 9:
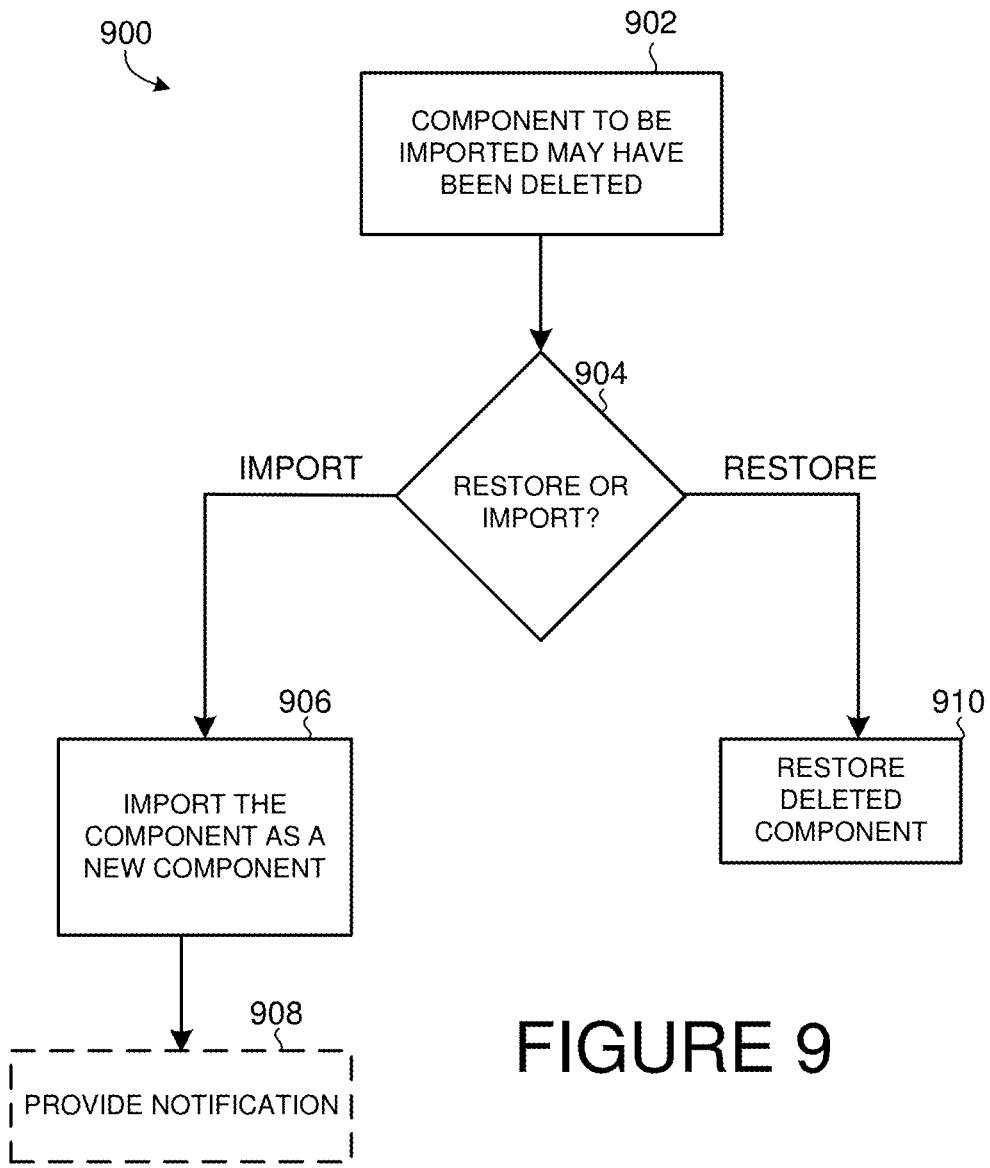
FIG. 9 illustrates an example of a computer-controlled method for resolving an identified potential component trash conflict in accordance with certain embodiments of the disclosed technology.

FIG. 9 illustrates an example of a computer-controlled method 900 for resolving an identified potential component trash conflict in accordance with certain embodiments of the disclosed technology. At 902, a determination is made that a component of a template of a template package to be imported in a sites cloud service may have been deleted. The system can query a user, e.g., by way of a user interface, as to whether the user wishes to restore the deleted component rather than import the component as a new component, as indicated by 904. For example, the user interface can provide an "Okay" button for the user to indicate a desire for the system to proceed with the importing and a "Cancel" button for the user to indicate a desire to restore rather than import.

The system can import the component as a new component in the sites cloud service, as indicated by 906. The system can also provide a notification that, if the existing component is restored from Trash, it will be renamed, e.g., to avoid a potential conflict with the imported component. In certain embodiments where a component is restored and renamed, any name references to the restored component in the template can be automatically corrected. In certain embodiments where the system can perform the importing automatically, the system can provide a notification, e.g., to the user, regarding the action performed, as indicated by 908.

Responsive to an indication received by the system from a user indicating a decision to restore the deleted component, the system can restore the deleted component, as indicated by 910. This can be accomplished, for example, by the user cancelling the dialog, e.g., by selecting a "Cancel" button, to abort the import and then go to Trash to restore the component manually.

Figure 10A:
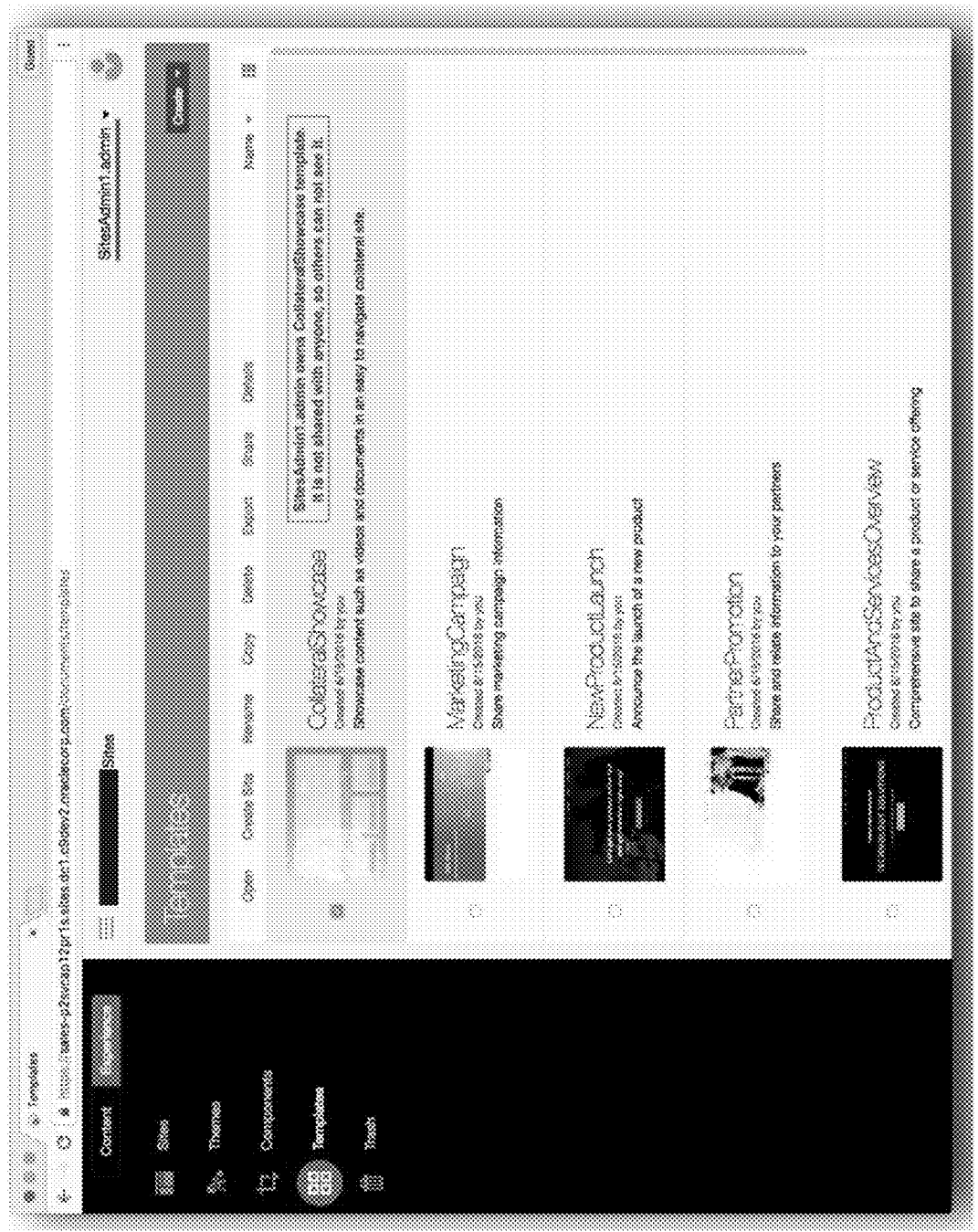
FIGS. 10A-G together illustrate an example of a sites cloud service template import conflict resolution in accordance with certain embodiments of the disclosed technology.

FIGS. 10A-G together illustrate an example of a sites cloud service template import conflict resolution in accordance with certain embodiments of the disclosed technology. FIG. 10A illustrates a screenshot 1000A that shows various templates that are available to SitesAdmin1.admin in the sites cloud service. In the example, the template CollateralShowcase is not shared with any users other than SitesAdmin1.admin so the template is visually presented to only SitesAdmin1.admin.

Figure 10B:
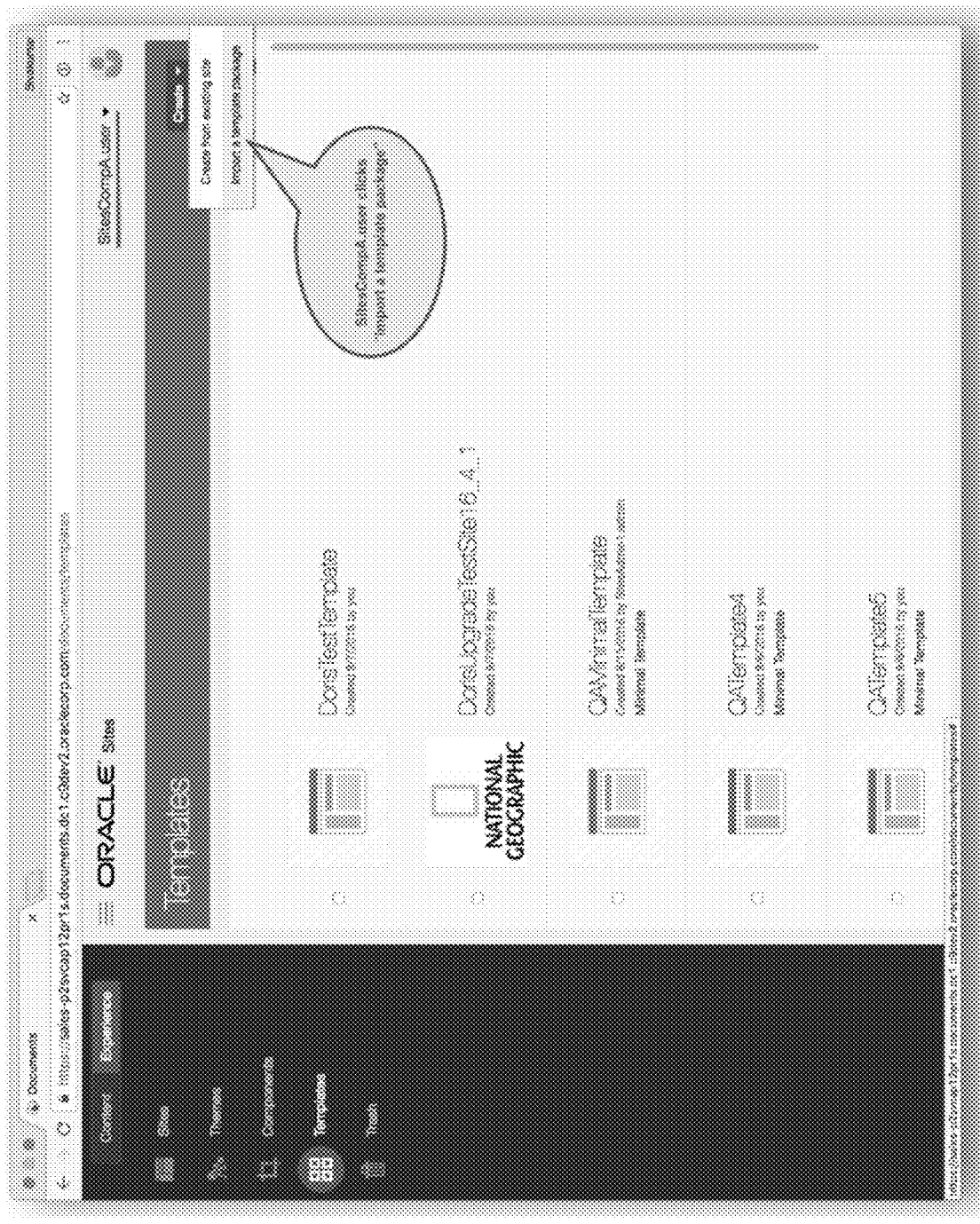

FIG. 10B illustrates a screenshot 1000B that shows various templates that are available to SitesCompA.user in the sites cloud service. Because the CollateralShowcase template is not shared with SitesCompA.user, the template is not visually presented to SitesCompA.user. Thus, should SitesCompA.user attempt to import the same CollateralShowcase template, a potential conflict would result due to SitesCompA.user's inability to see that the CollateralShowcase template already exists. In the example, SitesCompA.user selects the "Import a template package" option from the Create dropdown box.

Figure 10C:
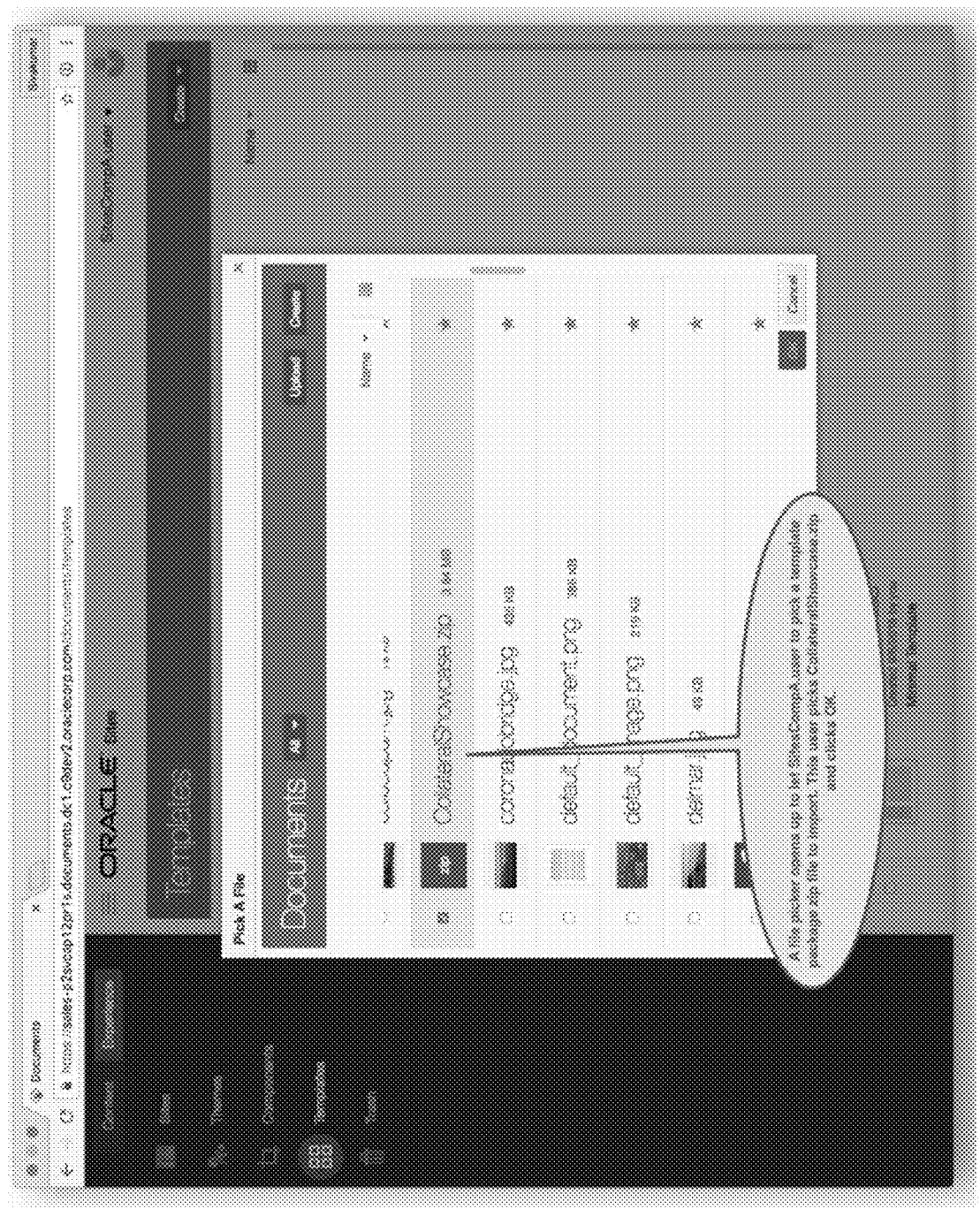

FIG. 10C illustrates a screenshot 1000C that shows the template packages that are available for SitesCompA.user to import, including the CollateralShowcase template [that already exists in the sites cloud service]. In the example, SitesCompA.user selects the CollateralShowcase.zip file to be imported which, as noted above, will result in a potential conflict.

Figure 10D:
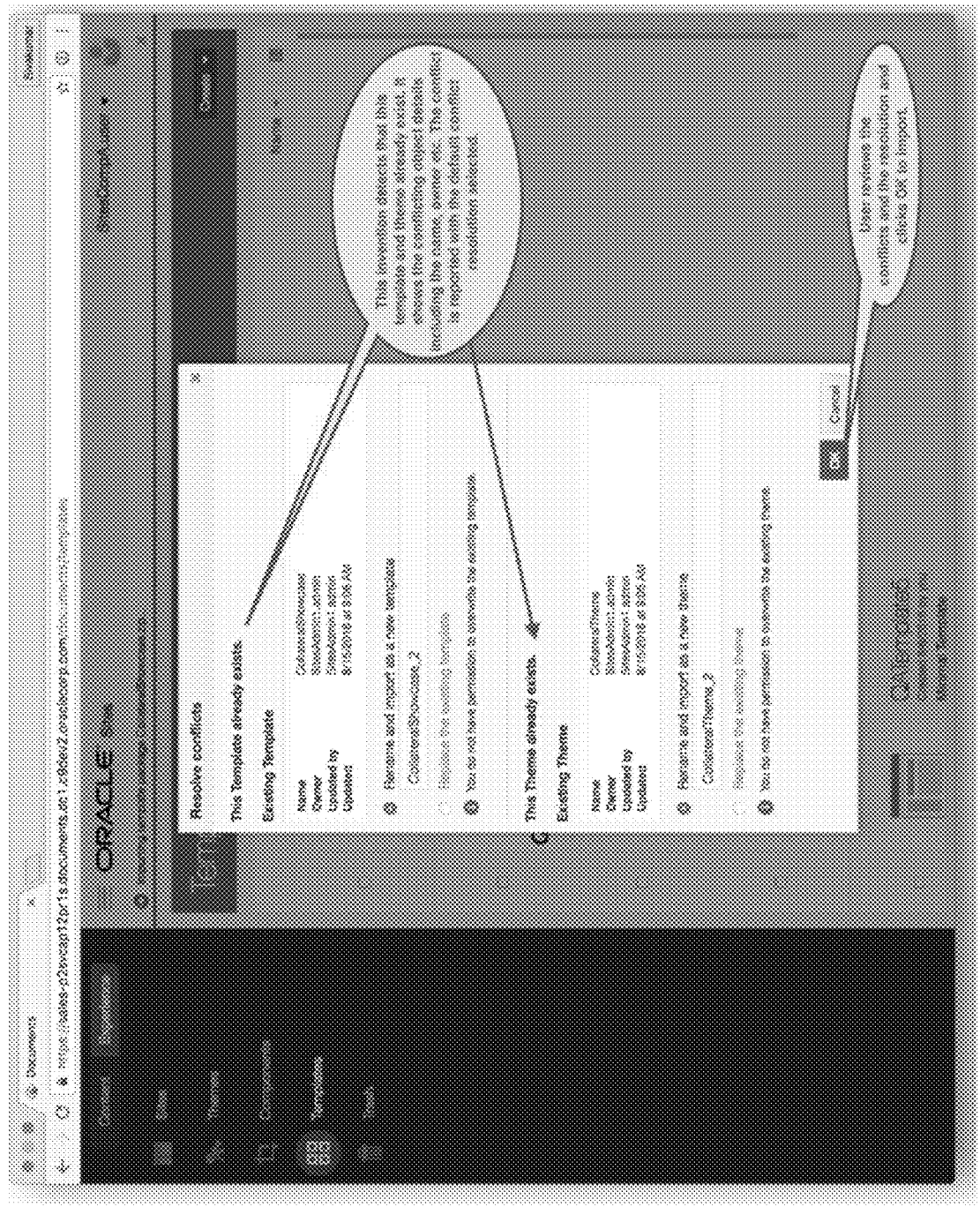

FIG. 10D illustrates a screenshot 1000D that shows a conflict resolution interface that is visually presented to SitesCompA.user. In the example, the interface communicates the conflict that results because the selected template (CollateralShowcase) and corresponding theme (CollateralTheme) already exist. In the example, SitesCompA.user users the interface to select the "Rename and import as new" option for both the template and the theme.

Figure 10E:
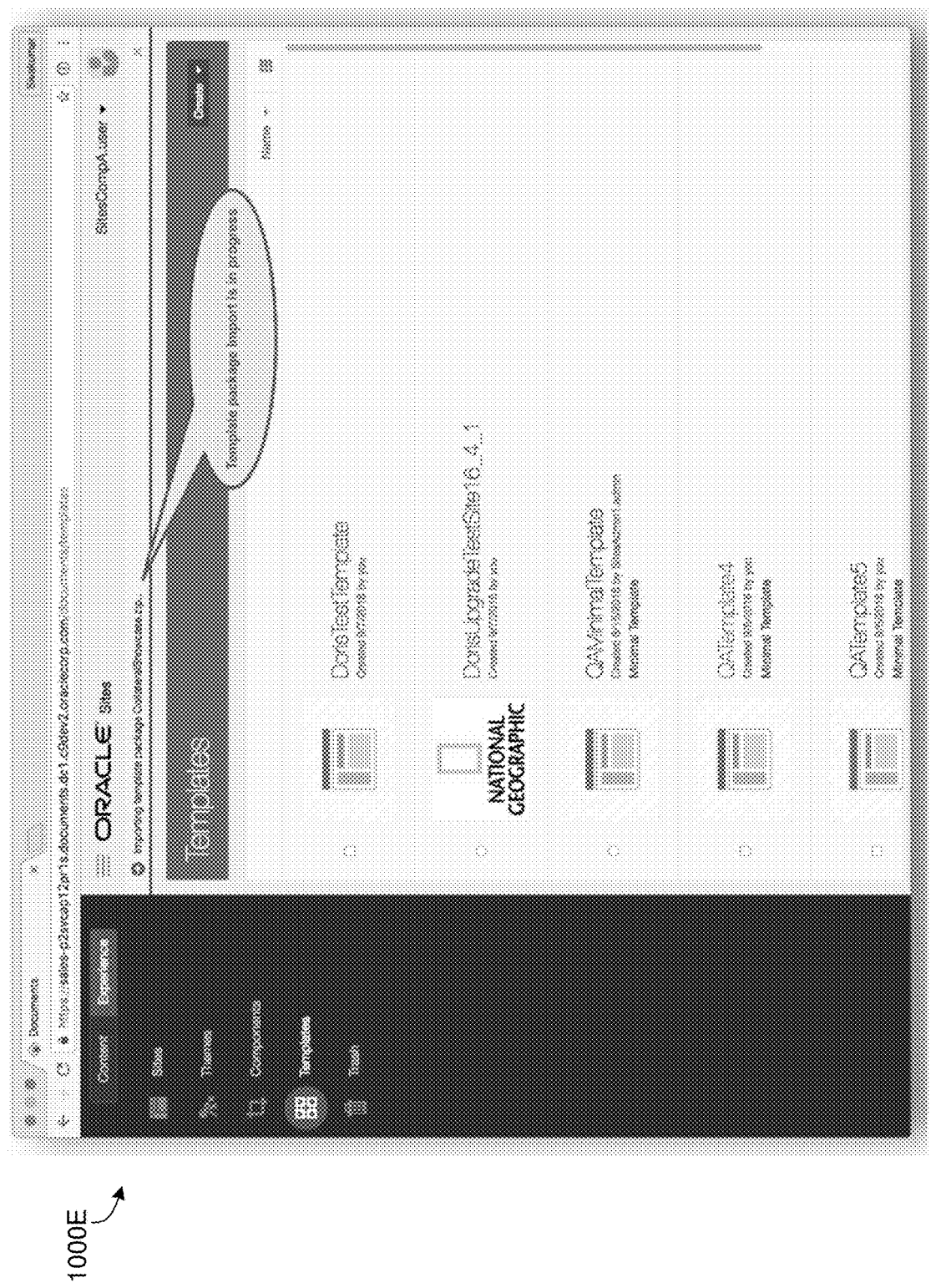

FIG. 10E illustrates a screenshot 1000E that shows a notification provided to SitesCompA.user indicating that the import of the CollateralShowcase template is currently in progress.

Figure 10F:
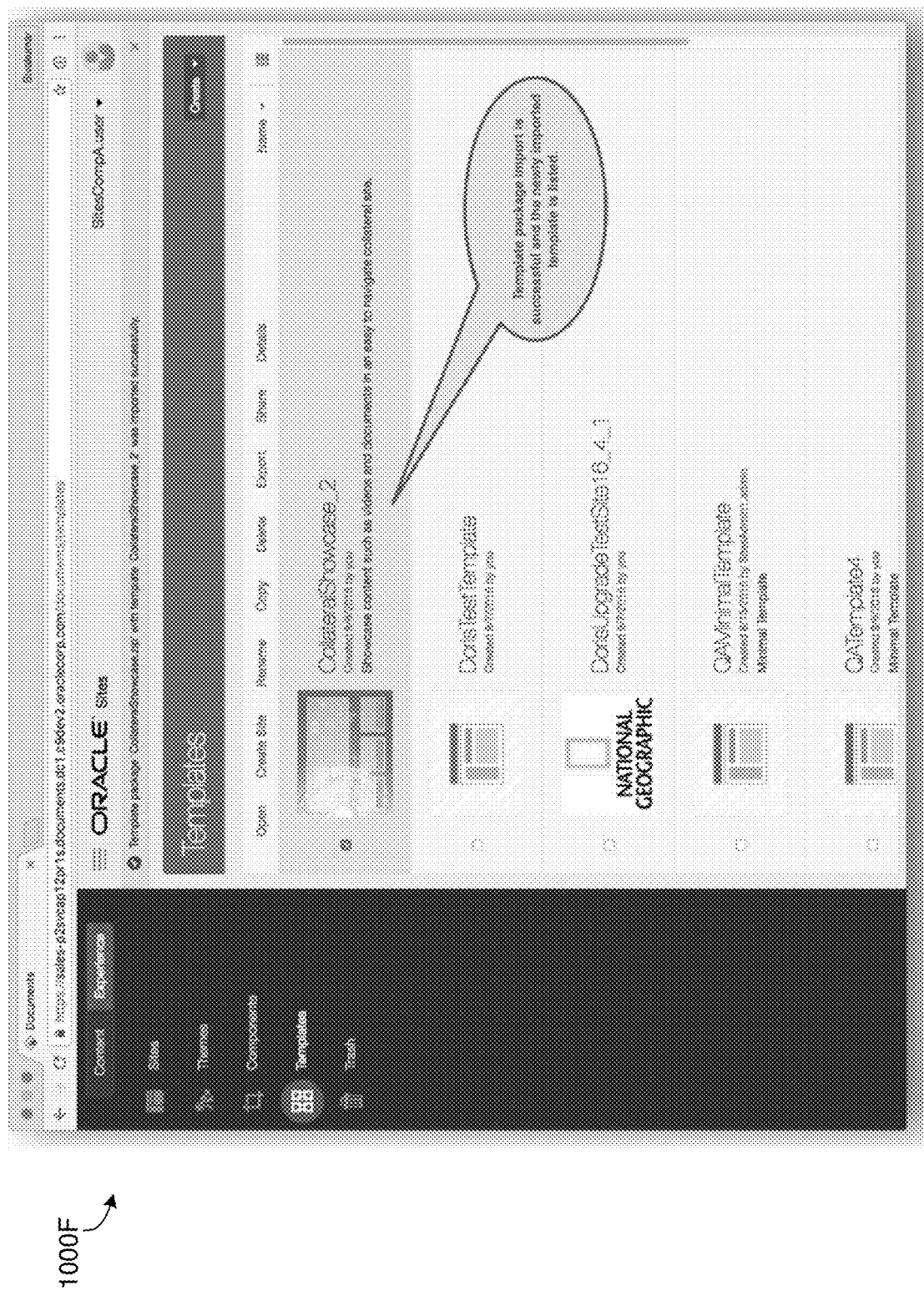

FIG. 10F illustrates a screenshot 1000F that shows a visual confirmation of a successful import of the CollateralShowcase_2 template. In the example, the CollateralShowcase_2 template is listed with the other templates that are available to SitesCompA.user.

Figure 10G:
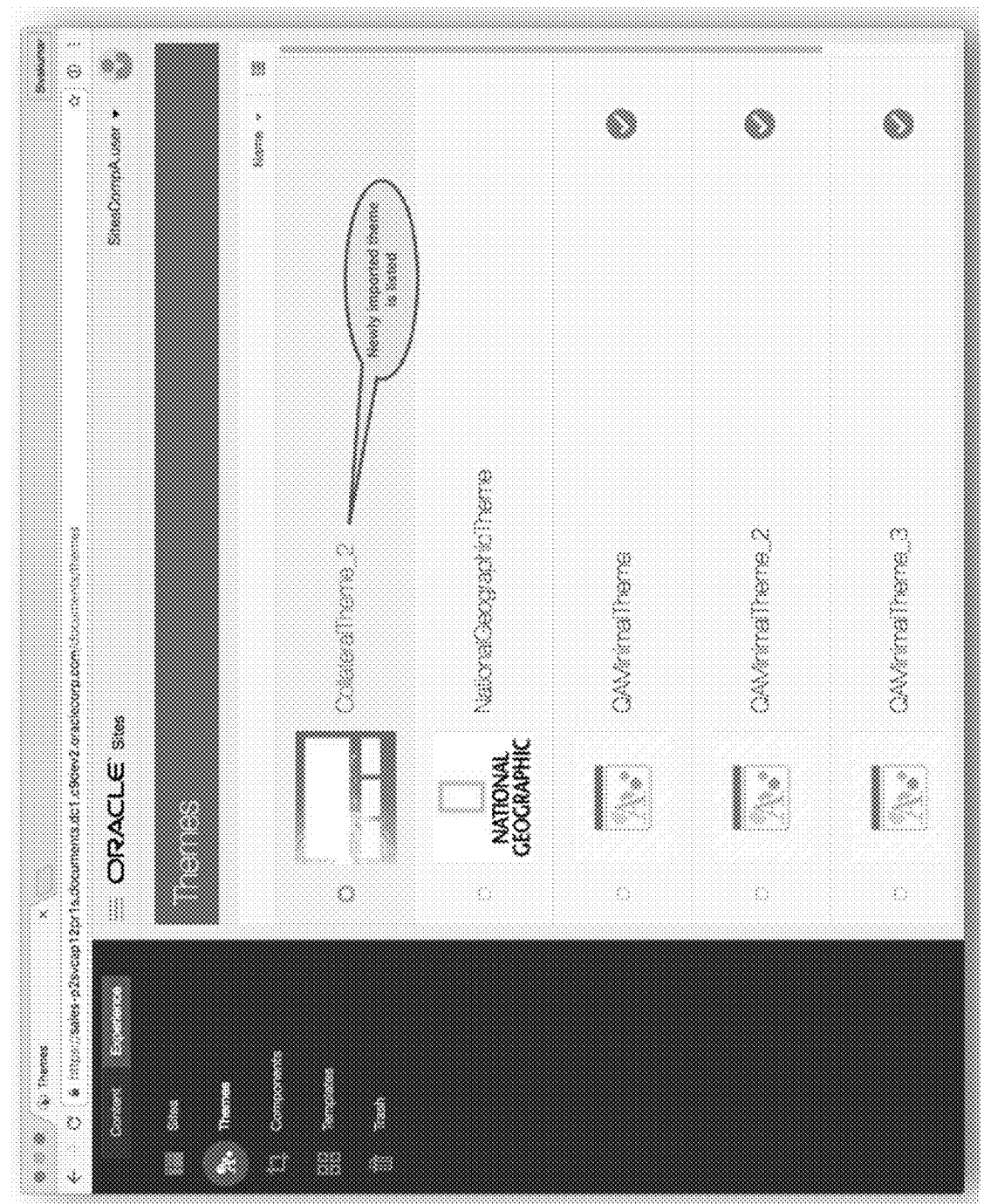

FIG. 10G illustrates a screenshot 1000G that shows a visual confirmation of a successful import of the CollateralTheme_2 theme. In the example, the CollateralTheme_2 theme is listed with the other themes that are available to SitesCompA.user.

The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines may include computing devices such as personal computers, workstations, servers, portable computers, handheld devices, tablet devices, and the like.

Typically, a machine includes a system bus to which processors, memory such as random access memory (RAM), read-only memory (ROM), and other state-preserving medium, storage devices, a video interface, and input/output interface ports can be attached. The machine may also include embedded controllers such as programmable or non-programmable logic devices or arrays, Application Specific Integrated Circuits (ASICs), embedded computers, smart cards, and the like. The machine may be controlled, at least in part, by input from conventional input devices such as keyboards and mice, as well as by directives received from another machine, interaction with a virtual reality (VR) environment, biometric feedback, or other pertinent input.

The machine may utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology may be described by reference to or in conjunction with associated data including functions, procedures, data structures, application programs, instructions, etc. that, when accessed by a machine, may result in the machine performing tasks or defining abstract data types or low-level hardware contexts. Associated data may be stored in, for example, volatile and/or non-volatile memory, such as RAM and ROM, or in other storage devices and their associated storage media, which can include hard-drives, floppy-disks, optical storage, tapes, flash memory, memory sticks, digital video disks, biological storage, and other non-transitory, physical storage media.

Associated data may be delivered over transmission environments, including the physical and/or logical network, in the form of packets, serial data, parallel data, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

What is claimed is:

1. A computer-implemented method, comprising:
receiving an indication of a template package to be imported in a sites cloud service, wherein the template package comprises a template, and a theme used by the template, and includes a plurality of components therein used in the template, each component being identified by a name and globally unique identifier (GUID);
determining that there is a potential conflict in connection with the template package being imported in the sites cloud service, including that a component of a template package to be imported in the sites cloud service has the same name and GUID as a component that already exists in the sites cloud service;
subsequent to a determination that there is a potential conflict in connection with the template package being imported in the sites cloud service, issuing a notification concerning the potential conflict in connection with the template package to be imported in the sites cloud service;
providing a user with at least one option for resolving the potential conflict in connection with the template package to be imported in the sites cloud service; and
resolving the potential conflict, after import of the component as a new component that yields a new GUID and name, by automatically correcting any GUID and name references to imported components in the template package;
wherein the determining that there is a potential conflict in connection with the template package being imported in the sites cloud service includes determining a permission associated with the user, and a conflict between contents of the template package with an existing template, theme, or component associated with another user; and
wherein the resolving the potential conflict includes, after import of the contents of the template package as new components that yield a new GUID and name, automatically correcting any GUID and name references to the imported components, and providing a notification to the user.

2. The computer-implemented method of claim 1, wherein determining whether there is a potential conflict includes determining that a template, theme, or component of the template package has a name that is the same as a name of an already-existing template, theme, or component in the sites cloud service.

3. The computer-implemented method of claim 2, further comprising:
renaming the template, theme, or component; and
importing the template, theme, or component as a new template, theme, or component in the sites cloud service.

4. The computer-implemented method of claim 1, wherein determining whether there is a potential conflict includes determining that a template, theme, or component of the template package has a globally unique identifier (GUID) that is the same as a GUID of an already-existing template, theme, or component in the sites cloud service.

5. The computer-implemented method of claim 4, further comprising importing the template, theme, or component as a new template, theme, or component in the sites cloud service.

6. The computer-implemented method of claim 5, further comprising determining whether there is a permission for the importing, wherein the importing is based on a determination that the permission exists.

7. The computer-implemented method of claim 4, further comprising replacing the already-existing template, theme, or component with the template, theme, or component of the template package.

8. The computer-implemented method of claim 7, further comprising presenting to a user an option for the replacing, wherein the replacing is based on an indication received from the user responsive to the option presented to the user.

9. The computer-implemented method of claim 1, wherein determining whether there is a potential conflict includes determining that a template, theme, or component of the template package has a name and a globally unique identifier (GUID) that are the same as a name and GUID of an already-existing template, theme, or component in the sites cloud service.

10. The computer-implemented method of claim 9, further comprising renaming and importing the template, theme, or component as a new template, theme, or component in the sites cloud service.

11. The computer-implemented method of claim 10, further comprising determining whether there is a permission for the importing, wherein the renaming importing are based on a determination that the permission exists.

12. The computer-implemented method of claim 9, further comprising replacing the already-existing template, theme, or component with the template, theme, or component of the template package.

13. The computer-implemented method of claim 12, further comprising presenting to a user an option for the replacing, wherein the replacing is based on an indication received from the user responsive to the option presented to the user.

14. The computer-implemented method of claim 1, wherein determining whether there is a potential conflict includes determining that a template, theme, or component of the template package may have been deleted in the sites cloud service.

15. The computer-implemented method of claim 14, further comprising importing the template, theme, or component as a new template, theme, or component in the sites cloud service.

16. The computer-implemented method of claim 14, further comprising restoring the deleted template, theme, or component.

17. The computer-implemented method of claim 1, wherein upon a first user attempting to upload the template package comprising the template, theme used by the template, and one or more components that conflicts with an existing template, theme, or other component associated with a second user, the resolving the potential conflict includes:
providing a notification to the first user of the potential conflict, and
receiving an input from the first user to rename and import the template package as a new option for its template and theme,
wherein the template package is imported and corrections made to any GUID and name references to imported components in the template package.

18. One or more tangible, non-transitory computer-readable media containing computer-executable instructions that, when executed by a processor, cause the processor to perform a method comprising:
- receiving an indication of a template package to be imported in a sites cloud service, wherein the template package comprises a template, and a theme used by the template, and includes a plurality of components therein used in the template, each component being identified by a name and globally unique identifier (GUID);
- determining that there is a potential conflict in connection with the template package being imported in the sites cloud service, including that a component of a template package to be imported in the sites cloud service has the same name and GUID as a component that already exists in the sites cloud service;
- subsequent to a determination that there is a potential conflict in connection with the template package being imported in the sites cloud service, issuing a notification concerning the potential conflict in connection with the template package to be imported in the sites cloud service;
- providing a user with at least one option for resolving the potential conflict in connection with the template package to be imported in the sites cloud service; and
- resolving the potential conflict, after import of the component as a new component that yields a new GUID and name, by automatically correcting any GUID and name references to imported components in the template package;
- wherein the determining that there is a potential conflict in connection with the template package being imported in the sites cloud service includes determining a permission associated with the user, and a conflict between contents of the template package with an existing template, theme, or component associated with another user; and
- wherein the resolving the potential conflict includes, after import of the contents of the template package as new components that yield a new GUID and name, automatically correcting any GUID and name references to the imported components, and providing a notification to the user.

19. A system, comprising:
- a display device; and
- a processor configured to:
- receive an indication of a template package to be imported in a sites cloud service, wherein the template package comprises a template, and a theme used by the template, and includes a plurality of components therein used in the template, each component being identified by a name and globally unique identifier (GUID);
- determine that there is a potential conflict in connection with the template package being imported in the sites cloud service, including that a component of a template package to be imported in the sites cloud service has the same name and GUID as a component that already exists in the sites cloud service;
- subsequent to a determination that there is a potential conflict in connection with the template package being imported in the sites cloud service, cause the display device to visually present to a user a notification concerning the potential conflict in connection with the template package to be imported in the sites cloud service;
- provide a user with at least one option for resolving the potential conflict in connection with the template package to be imported in the sites cloud service; and
- resolve the potential conflict, after import of the component as a new component that yields a new GUID and name, by automatically correcting any GUID and name references to imported components in the template package;
- wherein determining that there is a potential conflict in connection with the template package being imported in the sites cloud service includes determining a permission associated with the user, and a conflict between contents of the template package with an existing template, theme, or component associated with another user; and
- wherein resolving the potential conflict includes, after import of the contents of the template package as new components that yield a new GUID and name, automatically correcting any GUID and name references to the imported components, and providing a notification to the user.

* * * * *

UNITED STATES PATENT AND TRADEMARK OFFICE
CERTIFICATE OF CORRECTION

PATENT NO. : 11,632,317 B2
APPLICATION NO. : 15/663180
DATED : April 18, 2023
INVENTOR(S) : Balagopalan et al.

Page 1 of 1

It is certified that error appears in the above-identified patent and that said Letters Patent is hereby corrected as shown below:

In the Specification

In Column 4, Line 35, delete "GUILD" and insert -- GUID --, therefor.

In Column 6, Line 46, before "imported" insert -- the --, therefor.

In Column 6, Line 46, delete "he" and insert -- be --, therefor.

Signed and Sealed this
Sixteenth Day of April, 2024

Katherine Kelly Vidal
*Director of the United States Patent and Trademark Office*